(12) United States Patent
Rephaeli et al.

(10) Patent No.: US 11,017,500 B2
(45) Date of Patent: May 25, 2021

(54) IMAGE ACQUISITION USING TIME-MULTIPLEXED CHROMATIC ILLUMINATION

(71) Applicant: Verily Life Sciences LLC, Mountain View, CA (US)

(72) Inventors: Eden Rephaeli, Oakland, CA (US); James Polans, Oakland, CA (US); Daniele Piponi, San Francisco, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 293 days.

(21) Appl. No.: 16/154,191

(22) Filed: Oct. 8, 2018

(65) Prior Publication Data

US 2020/0111193 A1    Apr. 9, 2020

(51) Int. Cl.
*G06T 3/40*       (2006.01)
*H04N 5/235*      (2006.01)

(52) U.S. Cl.
CPC .......... *G06T 3/4015* (2013.01); *G06T 3/4053* (2013.01); *H04N 5/2355* (2013.01)

(58) Field of Classification Search
USPC ........................................................ 396/307
See application file for complete search history.

(56) References Cited

U.S. PATENT DOCUMENTS

| 4,967,264 A * | 10/1990 | Parulski | ................. | H04N 1/195 348/271 |
| 5,046,162 A * | 9/1991 | Ishikawa | ............... | H04N 5/2254 348/270 |
| 6,700,669 B1 * | 3/2004 | Geng | ................. | G01B 11/2513 356/602 |

(Continued)

FOREIGN PATENT DOCUMENTS

EP          2407763 A2     1/2012

OTHER PUBLICATIONS

Georgriev, T. et al., "Superresolution with Focused Plenoptic Camera", Proceedings vol. 7873, Computational Imaging IX; 78730X, San Francisco, 2011, 13 pages.

(Continued)

*Primary Examiner* — Rodney E Fuller
(74) *Attorney, Agent, or Firm* — Christensen O'Connor Johnson Kindness PLLC

(57) ABSTRACT

An imaging system includes an image sensor having an array of sensor pixels, a multi-chromatic illuminator adapted to independently generate a plurality of illumination colors each having a different finite spectral range, and a controller coupled to the image sensor and to the multi-chromatic illuminator. The controller includes logic to time-multiplexing the multi-chromatic illuminator between the illumination colors. Each of the illumination colors independently illuminates for at least a corresponding one of non-overlapping durations of illumination of the illumination colors. The controller includes further logic to acquire chromatic sub- (Continued)

images with the image sensor and combine the chromatic sub-images into a composite color image. Each of the chromatic sub-images is acquired during a different one of the non-overlapping durations of illumination.

26 Claims, 6 Drawing Sheets

(56) References Cited

U.S. PATENT DOCUMENTS

| | | | |
|---|---|---|---|
| 7,349,104 B2* | 3/2008 | Geng | A61B 5/1077 |
| | | | 356/603 |
| 8,179,445 B2 | 5/2012 | Hao | |
| 9,137,503 B2 | 9/2015 | Waqas et al. | |
| 9,361,662 B2 | 6/2016 | Lelescu et al. | |
| 9,661,218 B2 | 5/2017 | Deever | |
| 2005/0283065 A1* | 12/2005 | Babayoff | G01J 3/0208 |
| | | | 600/407 |
| 2014/0267351 A1* | 9/2014 | Klaus | H04N 1/58 |
| | | | 345/589 |
| 2015/0130958 A1 | 5/2015 | Pavani | |
| 2016/0014314 A1* | 1/2016 | Laroia | H04N 5/2254 |
| | | | 348/273 |
| 2016/0213249 A1* | 7/2016 | Cornsweet | A61B 3/152 |

OTHER PUBLICATIONS

Park et al., "Multispectral Imaging Using Multiplexed Illumination", ICCV 2007. IEEE 11th International Conference on Computer Vision, Jan. 1, 2007, pp. 1-8.

Konnik et al., "Increasing Linear Dynamic Range of Commercial Digital Photocamera Used in Imaging Systems with Optical Coding", ARXIV. Org., Cornell University, May 17, 2008, pp. 1-10.

International Search Report & Written Opinion, dated Nov. 29, 2019, for corresponding international patent application No. PCT/US2019/053890, 15 pages.

* cited by examiner

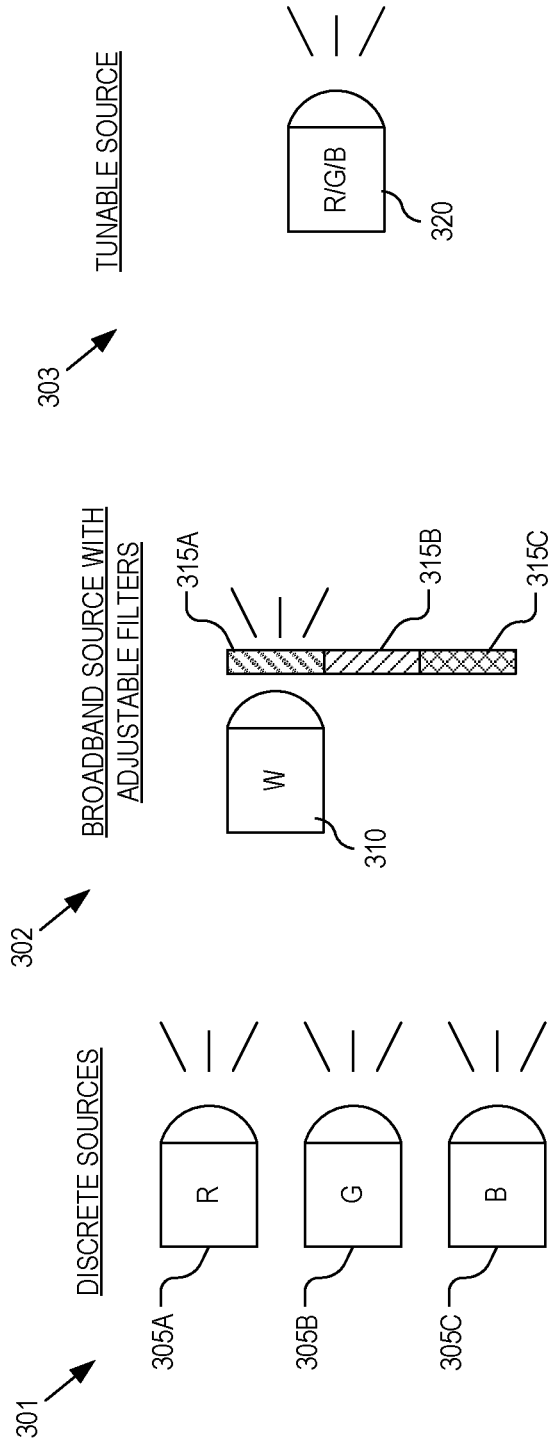

IMAGE ACQUISITION USING TIME-MULTIPLEXED CHROMATIC ILLUMINATION

TECHNICAL FIELD

This disclosure relates generally to color image sensors, and in particular but not exclusively, relates to super-resolution demosaicing or high dynamic range imaging.

BACKGROUND INFORMATION

Demosaicing reconstructs a full color image from incomplete color samples output from an image sensor that is overlaid by a color filter array (CFA). The demosaicing process sacrifices spatial resolution due to the need to perform interpolation in order to obtain the red, green and blue (R, G, B) color data for each image pixel. Both charge coupled device (CCD) and complementary metal-oxide-semiconductor (CMOS) color image sensors suffer reduced spatial resolution due to the demosaicing process. The reduction in resolution results is a direct result of the fact that each sensor pixel in the image sensor has only one color filter (R or G or B), and the CFA is typically structured in groups of four sensor pixels, where one of the sensor pixels has a blue filter, another has a red filter, while the remaining two have green filters, as seen in FIG. 1. This common pattern is referred to as a Bayer pattern. Thus, for any given image sensor array, one-half of the sensor pixels have a green color filter, one-quarter of the sensor pixels have a blue color filter, while one-quarter of the sensor pixels have a red color filter.

Since virtually all color image sensors employ the Bayer pattern CFA structure detailed above, and consequently interpolate between nearest like-colored pixels in order to obtain R, G, B data for each image pixel, it follows that using a color image sensor inherently limits the Nyquist spatial frequency of the blue and red channels to one-half the Nyquist frequency of an identical camera whose color filters were removed. Similarly, the green channel's Nyquist frequency is reduced by $1/\sqrt{2}$. This is the price of color.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

FIGS. 3A, 3B, and 3C illustrate example implementations of a multi-chromatic illuminator, in accordance with embodiments of the disclosure.

DETAILED DESCRIPTION

Embodiments of a system, apparatus, and method of operation for a camera system that acquires color images using time multiplexed chromatic illumination to generate super-resolution color images and/or high definition range (HDR) color images are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The field of super-resolution includes various conventional algorithms whose aim is to increase the resolution of a color image via the demosaicing/interpolation process. These conventional algorithms are typically computational only, attempting to use either a model or a priori information to extract a higher resolution image from the regular resolution image captured by a color image sensor array. In contrast, embodiments described herein use a sequential multi-chromatic illumination scheme coupled with knowledge of the quantum efficiencies (QEs) of the sensor pixels and color filter array (CFA) to generate super resolution images and/or HDR images from a color image sensor.

Figure 1:
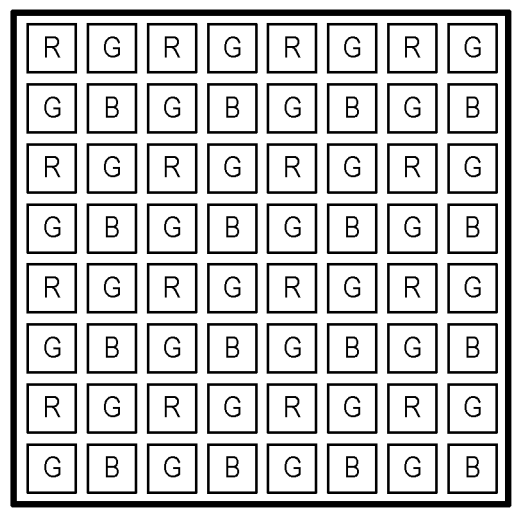
FIG. 1 (PRIOR ART) illustrates a conventional Bayer pattern color filter array including red, green, and blue filter elements that overlay an image sensor array.
Figure 2A:
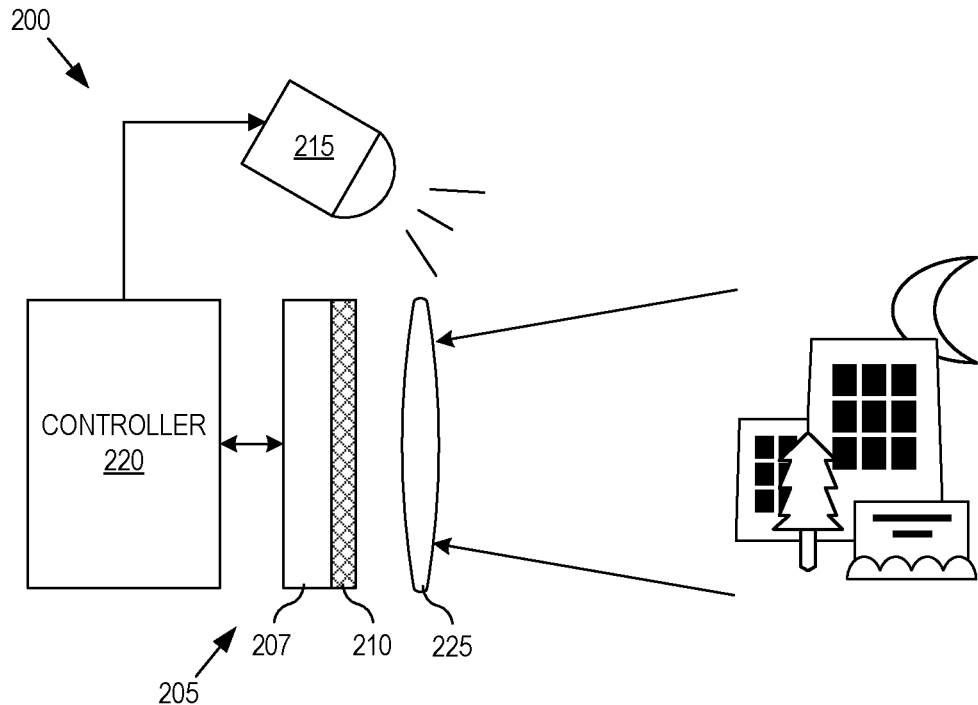
FIG. 2A is a functional block diagram illustrating an imaging system that time-multiplexes a multi-chromatic illuminator to acquire chromatic sub-images, in accordance with an embodiment of the disclosure.

FIG. 2A illustrates the components of an imaging system 200 capable of acquiring color images using time multiplexed multi-chromatic illumination to generate super-resolution color images and/or HDR color images. The illustrated embodiment of system 200 includes an image sensor 205 including a sensor array 207 overlaid by a CFA 210, a multi-chromatic illuminator 215, a controller 220, and a lens 225.

Sensor array 207 may be implemented using a variety of image sensor technologies including CCD sensors, CMOS sensors, or otherwise. Controller 220 orchestrates the operation of the other functional components and may include logic implemented in hardware (e.g., application specific integrated circuit, field programmable gate array, etc.), logic instructions implemented in software/firmware and executed by a general purpose microcontroller, or implemented with a combination of hardware and software logic. CFA 210 may be implemented as a Bayer pattern CFA having red (R), green (G), and blue (B) filter elements, or other CFA patterns using other color filter elements (e.g., CYYM, CYGM, RGBW, etc.).

Multi-chromatic illuminator 215 is a multispectral composite light source capable of sequentially generating different illumination colors of finite spectral range or linewidth. For visible spectrum color images, in order to provide sufficient color accuracy in the output color image, multi-chromatic illuminator 215 may have a first color source, such as a blue source with some energy in the 400-460 nm wavelength range, a second color source, such as a green source with some energy in the 460 nm-560 nm wavelength range, and a third color source, such as a red source with some energy in the 620 nm-700 nm range. Of course, if image sensor 205 extends beyond the visible spectrum or operates entirely outside the visible spectrum, then multi-chromatic illuminator 215 may generate illumination colors in other wavelength bands and may even include more or less than three illumination sources working across more or less distinct finite spectral ranges.

FIGS. 3A-3C illustrate different examples for implementing multi-chromatic illuminator 215, in various embodiments. For example, FIG. 3A illustrates a multi-chromatic illuminator 301 formed from three discrete illumination sources 305A, 305B, and 205C each tuned for generating illumination light having a different illumination color. For example, illuminator source 305A outputs red illumination light, illuminator source 305B outputs green illumination light, and illuminator source 305C outputs blue illumination light. Of course, other color and wavelength bands or spectral ranges may be implemented. FIG. 3B illustrates a multi-chromatic illuminator 302 implemented using a broadband illuminator source 310 (e.g., generating white light) overlaid by a tunable/dynamic set of bandlimited filters 315A-C. Filters 315A-C may be moved, or otherwise selected, in a timeshared manner. FIG. 3C illustrates a multi-chromatic illuminator 303 implemented using a tunable light source 320 capable of selectively generating multiple distinct, bandlimited illumination colors.

Figure 2B:
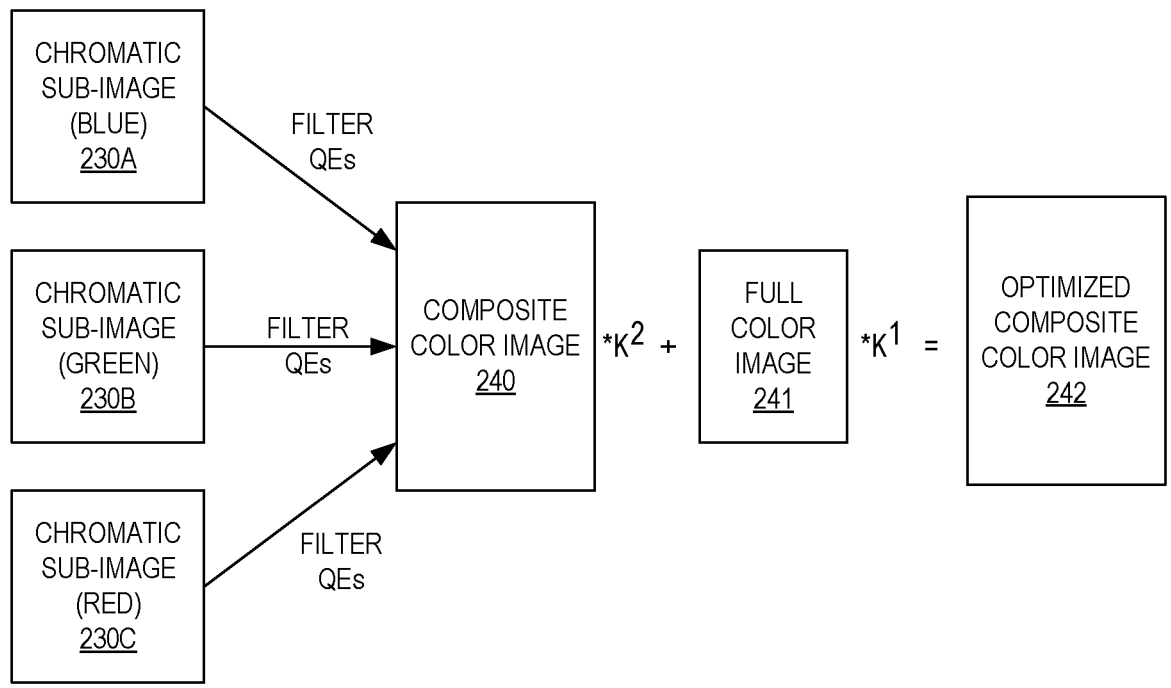
FIG. 2B illustrates the combination of chromatic sub-images into a composite color image, which may be further optimized, in accordance with an embodiment of the disclosure.
Figure 4:
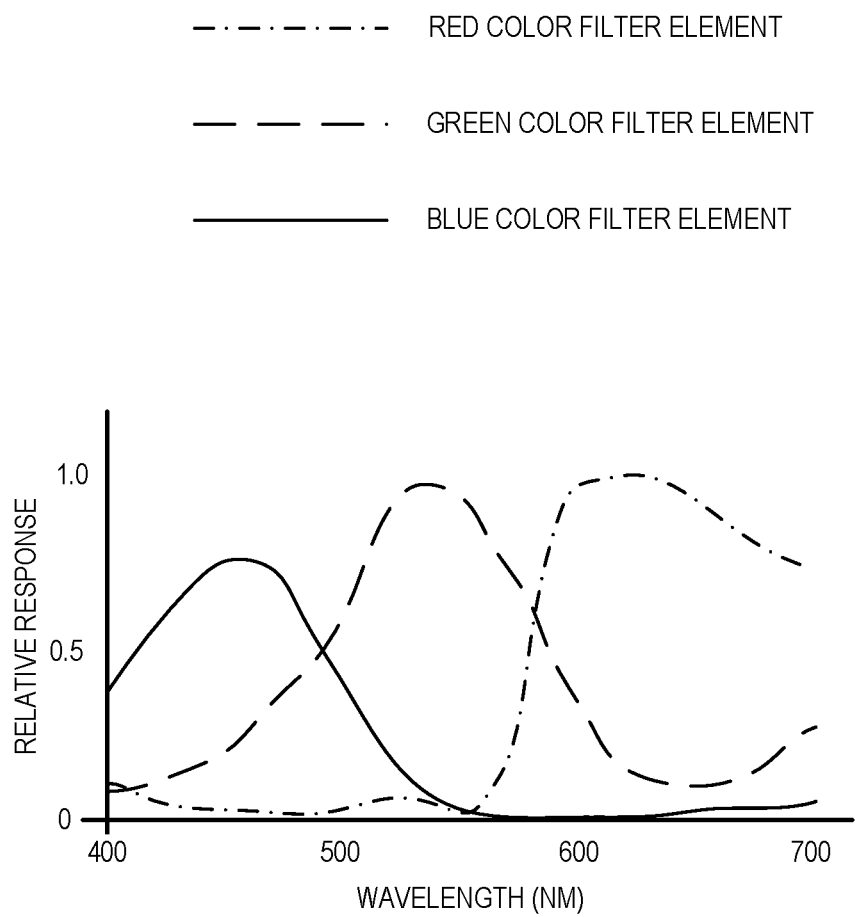
FIG. 4 is a chart illustrating wavelength dependent quantum efficiencies of red, green, and blue color filter elements, in accordance with an embodiment of the disclosure.

Turning to FIG. 2B, imaging system 200 is capable of capturing super-resolution and/or HDR images using a technique that acquires multiple chromatic sub-images 230A-C each illuminated by a different illumination color by multi-chromatic illuminator 215 during non-overlapping temporal durations. In various embodiments, these chromatic sub-images may be acquired at 3× the desired frame-rate. Multiple chromatic sub-images 230A-C are extracted from image sensor 205 as high-resolution images by leveraging knowledge of the spectral QE of image sensor 205. For example, FIG. 4 illustrates a typical quantum efficiency of red, green, and blue color filter elements in a CFA. As illustrated, the wavelength dependent QE can be characterized. This wavelength dependent QE can be leveraged to extract red and blue color image values from a sensor pixel covered by a green filter, extract green and blue color image values from a sensor pixel covered by a red filter, and extract red and green color image values from a sensor pixel covered by a blue filter when the illumination colors are time-multiplexed for at least some non-overlapping durations. The QE is often available from image sensor manufactures, but can also be measured. The QEs of the three color filter types in CFA 210 of a typical Bayer pattern filter will be referred to as $QE^{(c)}(\lambda)$, where c=r, g, or b.

Returning to FIG. 3A (as a demonstrative example), the spectral irradiance (e.g., watts per square meter) of each illuminator source 305 of multi-chromatic illuminator 301 is denoted as follows: sources whose spectral irradiance lies within the blue color filter sensitivity range are denoted by $S_{(b)}^{(1)}(\lambda)$, $S_{(b)}^{(2)}(\lambda)$ ... $S_{(b)}^{(N)}(\lambda)$, where the superscript denotes the number of the source. Similarly, sources whose spectral irradiance lies within the green color filter sensitivity range will be denoted as $S_{(g)}^{(1)}(\lambda)$, $S_{(g)}^{(2)}(\lambda)$ ... $S_{(g)}^{(N)}(\lambda)$, and sources whose spectral irradiance lies within the red color filter sensitivity range will be denoted as $S_{(r)}^{(1)}(\lambda)$, $S_{(r)}^{(2)}(\lambda)$ ... $S_{(r)}^{(N)}(\lambda)$.

Controller 220 operates to generate composite color image 240 from chromatic sub-images 230 as follows. First, chromatic sub-image 230A is captured with all blue sources on, denoted by $I_b[n_x, n_y]$. Then, we define $I_b^{(b)}[n_x, n_y]$, the image obtained from $i_b$ by zeroing out the intensity values for all green and red color filters. $n_x$ and $n_y$ are indexes running over all the pixel columns and rows of the image sensor. Note, the superscript of I corresponds to the Bayer filter color and the subscript corresponds to the illumination source color, $I_{source\ color}^{(filter\ color)}$.

Second, we capture chromatic sub-image 230B with all green sources on, denoted by $I_g[n_x, n_y]$. Then, we define $I_b^{(g)}[n_x, n_y]$, the image obtained from $I_g$ by zeroing out the intensity values for all blue and red color filters. $n_x$ and $n_y$ are indexes running over all the pixel columns and rows of the image sensor.

Third, we capture chromatic sub-image 230C with all red sources on, denoted by $I_r[n_x, n_y]$. Then, we define $I_r^{(r)}[n_x, n_y]$, the image obtained from I, by zeroing out the intensity values for all green and blue color filters. $n_x$ and $n_y$ are indexes running over all the pixel columns and rows of the image sensor.

With the three chromatic sub-images 230 acquired, composite color image 240 is created based upon a combination of the three chromatic sub-images 230 as follows (superscript HR stands for high resolution):

$$I^{(HR,b)}[n_x, n_y] = \frac{I_b^{(b)}[n_x, n_y]}{\sum_{i=1}^{N} \int d\lambda S_b^{(i)}(\lambda) QE^{(b)}(\lambda)} +$$

$$\frac{I_b^{(g)}[n_x, n_y]}{\sum_{i=1}^{N} \int d\lambda S_b^{(i)}(\lambda) QE^{(g)}(\lambda)} + \frac{I_b^{(r)}[n_x, n_y]}{\sum_{i=1}^{N} \int d\lambda S_b^{(i)}(\lambda) QE^{(r)}(\lambda)}$$

$$I^{(HR,g)}[n_x, n_y] = \frac{I_g^{(b)}[n_x, n_y]}{\sum_{i=1}^{N} \int d\lambda S_g^{(i)}(\lambda) QE^{(b)}(\lambda)} +$$

$$\frac{I_g^{(g)}[n_x, n_y]}{\sum_{i=1}^{N} \int d\lambda S_g^{(i)}(\lambda) QE^{(g)}(\lambda)} + \frac{I_b^{(r)}[n_x, n_y]}{\sum_{i=1}^{N} \int d\lambda S_g^{(i)}(\lambda) QE^{(r)}(\lambda)}$$

$$I^{(HR,r)}[n_x, n_y] = \frac{I_r^{(b)}[n_x, n_y]}{\sum_{i=1}^{N} \int d\lambda S_r^{(i)}(\lambda) QE^{(b)}(\lambda)} +$$

$$\frac{I_r^{(g)}[n_x, n_y]}{\sum_{i=1}^{N} \int d\lambda S_r^{(i)}(\lambda) QE^{(g)}(\lambda)} + \frac{I_r^{(r)}[n_x, n_y]}{\sum_{i=1}^{N} \int d\lambda S_r^{(i)}(\lambda) QE^{(r)}(\lambda)}.$$

Finally, we define composite color image 240 as:

$$I^{(HR)}[n_x,n_y]=(I^{(HR,b)}[n_x,n_y],I^{(HR,g)}[n_x,n_y],I^{(HR,r)}[n_x,n_y]).$$

At this point, composite color image 240, $I^{(HR)}[n_x, n_y]$, can be used as a high resolution version of the original full color image $I[n_x, n_y]$ (which would be a conventional image obtained by turning all of the sources on at once, taking an image, and performing pixel demosaicing (including pixel interpolation)).

Due to the variation of the QEs of the color filter elements across the visible spectrum, in addition to having higher spatial resolution than $I[n_x, n_y]$, $I^{(HR)}[n_x, n_y]$ also has higher noise levels. To reduce the noise levels, $I^{(HR)}[n_x, n_y]$ can be further refined or optimized using a variety of strategies. Since a preferred image quality metric relevant in this situation is some combination of the dynamic range of the image and the spatial resolution of the image, an optimized image is a combination of $I^{(HR)}[n_x, n_y]$ and $I[n_x, n_y]$ (the conventional full color image). Consequently, composite color image 240 can be further refined to generate the optimal image:

$$I^{(Optimal)}[n_x, n_y]=K^{(1)}[n_x, n_y]*I[n_x, n_y]+K^{(2)}[n_x, n_y]*I^{(HR)}[n_x, n_y],$$

where $K^{(1)}[n_x, n_y]$ and $K^{(2)}[n_x, n_y]$ are two-dimensional convolution kernels with finite spatial support that are solved by optimizing for a merit function combining spatial resolution and dynamic range. The symbol * denotes a two-dimensional convolution, i.e.:

$$K^{(1)}[n_x, n_y]*I[n_x, n_y] = \sum_{n'_x=-\infty}^{\infty}\sum_{n'_y=-\infty}^{\infty} K^{(1)}[n'_x, n'_y]I[n_x - n'_x, n_y - n'_y]$$

$$K^{(2)}[n_x, n_y]*I[n_x, n_y] = \sum_{n'_x=-\infty}^{\infty}\sum_{n'_y=-\infty}^{\infty} K^{(2)}[n'_x, n'_y]I[n_x - n'_x, n_y - n'_y]$$

This optimization can be performed by acquiring the following three images:

Image 1: an image whose object space contains, for example, a 50% diffuse reflectance standard;

Image 2: an image whose object space contains a black reflectance standard (i.e., very low diffuse reflectance); and Image 3: an image whose object space contains a slanted edge resolution target. Using the images 1 and 2, a dynamic range value can be calculated in a patch of image pixels of a general size (can be for every single image pixel). Using image 3, the spatial resolution can be calculated. From this, a merit function combining the two metrics can be constructed. Using this merit function, we can solve for $K^{(1)}[n_x, n_y]$, and $K^{(2)}[n_x, n_y]$. Depending on the size of the kernel functions' spatial support, the number of images required to solve for the kernel can vary. Accordingly, a conventional full color image 241, acquired with all illumination colors of multi-chromatic illuminator 215 simultaneously enabled, can be combined with super resolution composite color image 240 via convolution kernels $K^{(1)}[n_x, n_y]$ and $K^{(2)}[n_x, n_y]$ to generate a yet further optimized composite color image 242.

Knowledge of the wavelength dependent QE of the color pixels or color filters can be used to further optimize the color data extracted from image sensor 205. For example, consider a particular sensor pixel in pixel array 207 covered by a red filter type in the Bayer CFA 210. Normally it is used to measure red light. But it can also be used to measure blue light (or even green light). This measurement typically has a high variance because it requires high gain due to the red filter blocking most (but not all) of the incident blue light. However, there are nearby blue sensor pixels used to measure blue light and these will have a lower variance due to a lower applied gain. With a priori evidence that these nearby blue sensor pixels should have color that is correlated to the blue light entering at the red sensor pixel, this knowledge can be used to reduce the variance measurement (i.e., reduce the noise). Instead of using the high variance measurement on its own, a weighted combination of the high variance color data and its neighboring low variance color data is used. Given an objective measure of image quality (e.g., the sum of the variances for each sensor pixel) the weights to optimize this measure can be chosen. Since a variance often is proportional to the power of the signal, the signal power sometimes can be used as an analogous metric. Furthermore, with knowledge of the sample absorption and scattering profile, the weights can be further tuned.

Generically, the above optimization extracts first color data (e.g., red color data) from a sensor pixel overlaid by a filter element in CFA 210 of a different color filter type (e.g., green or blue) with reference to the wavelength dependent QE of the different color filter type. This extracted data is referred to as high noise data as it is expected to have a high noise level compared to extracting red color data from a red color sensor pixel (or green data from a green color sensor pixel or blue data from a blue color sensor pixel), which is referred to as low noise data. Accordingly, high noise data is optimized with reference to adjacent low noise data by taking a weighted combination of the low noise data with the high noise data.

Knowledge of the wavelength dependent QE of the color sensor pixels or color filter types in CFA 210 can be leveraged to acquire HDR color images as mentioned above. In particular, the wavelength dependent QEs of the color filter types in CFA 210 can be used to scale the image values output from the sensor pixels when combining chromatic sub-images 230 into composite color image 240. This optimization is included within the equations presented above for $I^{(HR,b)}[n_x, n_y]$, $I^{(HR,g)}[n_x, n_y]$, and $I^{(HR,r)}[n_x, n_y]$ where the denominator that scales the chromatic sub-images 230A, 230B, and 230C includes a different $QE^{(b)}$, $QE^{(g)}$, and $QE^{(r)}$, respectively.

One common challenge in medical imaging, videography, and photography is capturing HDR scenery. A scene with a high dynamic range refers to one in which there are bright objects, which are often overexposed (white), alongside dark objects, which are often underexposed (black). Conventionally, the challenge of imaging HDR scenery is addressed by imaging the scene multiple times with different exposure times and compiling the resulting images into a single balanced photo. Since the color filters of the Bayer pattern have different attenuation coefficients at the various wavelengths (i.e., wavelength dependent QEs of CFA 210), they can be used analogously to different exposure times of a camera. Rather than capturing three different exposures sequentially, this HDR imaging scheme allows for all three exposures to be captured simultaneously by the red, green and blue filtered sensor pixels. For example, if the scene is illuminated by the a red source and the sensor pixel under the matched red color filter saturates, then the sensor pixel under the blue color filter that heavily attenuates red light could still be used to capture the image without over saturating the underlying sensor pixel. The value under the blue sensor pixel may be noisy (high noise data) but it provides a relative intensity difference to other non-saturated pixels. The weighting kernel described previously can be modified to account for oversaturated pixels, thereby improving the dynamic range of the imaged scene in addition to improving the resolution of the image extracted from image sensor 205.

Accordingly, chromatic sub-images 230 may be combined to generate a HDR composite color image 240. This HDR combining technique includes identifying a saturated image value output from a saturated sensor pixel overlaid by a filter element of a first color type. The saturated image value is then adjusted based upon another image value extracted from an adjacent sensor pixel that is overlaid by a filter element of a second color type (different from the first color type). The other image value from the adjacent sensor pixel is determined with reference to the wavelength dependent QE of the second color filter type.

Exposing a scene sequentially to a red, then green, then blue light sources (or other illumination color combinations) and repeating that order is a logical approach, but other orderings could be beneficial in the event that there is object motion between exposures. For example, if all of the blue objects during the blue light exposure happen to align with red and green filtered sensor pixels, then the overall noise of the image will be high. In this scenario, it may make sense to expose the scene to the blue source again in hopes of the pixels align differently or provide the ability to average multiple blue exposures together. Total power of a given chromatic sub-image 230, obtained by summing the power of all image values in the given chromatic sub-image 230 before applying gain, is one such metric that could be used to determine whether the image is of low or high quality. In one embodiment, the summed total power is compared against a threshold total power value. If the total power associated with a given chromatic sub-image 230 falls below the threshold total power value, then the given chromatic sub-image 230 is reacquired with the associated illumination color. Additionally, since there is twice the number of green pixels to red and blue pixels in a typical Bayer pattern, it may make sense to have twice the number of red and blue source exposures in order to balance out this discrepancy.

Natural movement of the scene allows for noise reduction through temporal averaging as well. If the red source illuminates an object that maps to a blue filtered pixel, the noise from gain will be high. When the scene moves, that same object may now map to a red filtered pixel where the noise is low. By tracking the movement of a given scene and whether an object is over a high or low noise pixel, a temporal windowing function can be applied to the object that adaptively weights the kernels based on prior measurements as the object moves between a high noise pixel and a low noise pixel.

Figure 5:
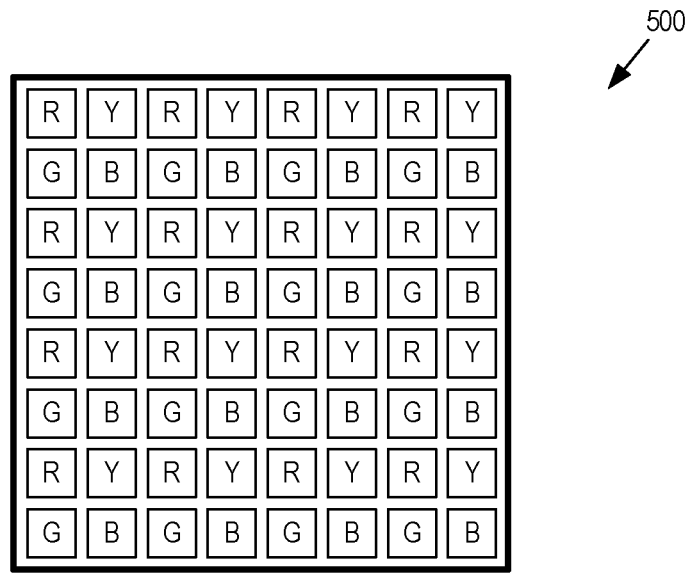
FIG. 5 illustrates a color filter array including a customized repeating pattern scheme, in accordance with an embodiment of the disclosure.

There are additional schemes that can take advantage of time-multiplexed multi-chromatic illumination, assuming that CFA 210 is not a traditional Bayer color filter array. FIG. 5 illustrates a first example custom CFA 500 that uses a different repeating pattern than a conventional Bayer pattern. In particular, CFA 500 includes a repeating pattern scheme that replaces the second green color filter in the Bayer pattern with a fourth color filter (e.g. yellow) that is matched to a fourth color source in multi-chromatic illuminator 215. The yellow channel offers a compromise in noise between the red and green channels and equalizes the spatial color distribution to ¼ red, ¼ green, ¼ blue, and ¼ yellow. Alternatively, if no color filter is used in the fourth spot, then a filterless channel would offer a robust, low-noise signal which could be used to adjust the weights of the adjacent pixels during the three RGB exposures. Of course, the fourth pixel spot may be overlaid by a color filter having a non-RGB color other than yellow or clear.

Figure 6:
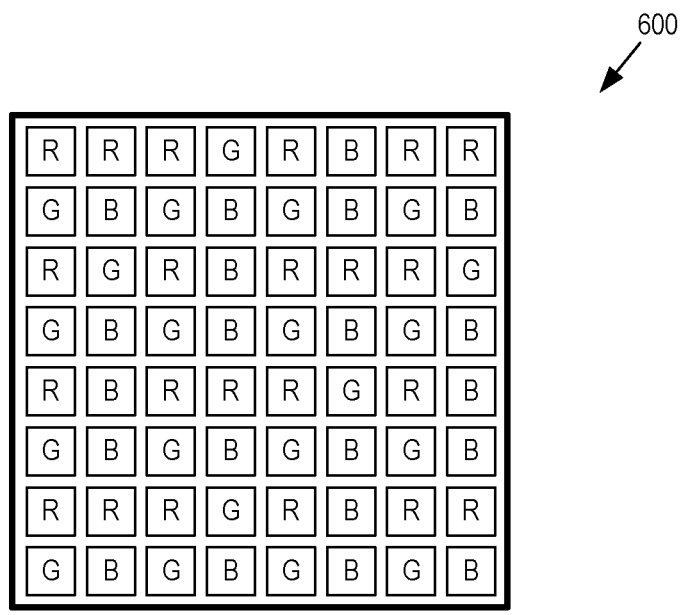
FIG. 6 illustrates a color filter array including a customized repeating pattern scheme, in accordance with another embodiment of the disclosure.

FIG. 6 illustrates a example custom CFA 600 that uses yet another different repeating pattern scheme, in accordance with another embodiment. The scheme illustrated in FIG. 6. alternates the fourth sensor pixel spot (i.e., the second green channel filter location of a Bayer pattern) between a rotating color (e.g., rotating between red, green, and blue color filters). An example distribution is shown in FIG. 6. This approach creates redundant RGB sensor pixels every six pixels laterally. This offers similar advantages to the original ¼ red, ½ green, ¼ blue distribution of a Bayer pattern but makes the split ⅓ red, ⅓ green, ⅓ blue, thereby improving the robustness to noise.

Yet a third alternative scheme removes the color filters entirely, making the sensor monochromatic, but still benefits from weighting/scaling the sub-images by the wavelength specific QE of the monochromatic sensor array. In this version, sequential exposure to the three colored sources is synchronized with the camera image acquisition. The pixels would no longer need to be amplified with gain, thereby eliminating amplified noise. Additionally, the absence of a filter allows for 100% of the power to be captured by the sensor, offering an advantage in power throughput.

Figure 7:
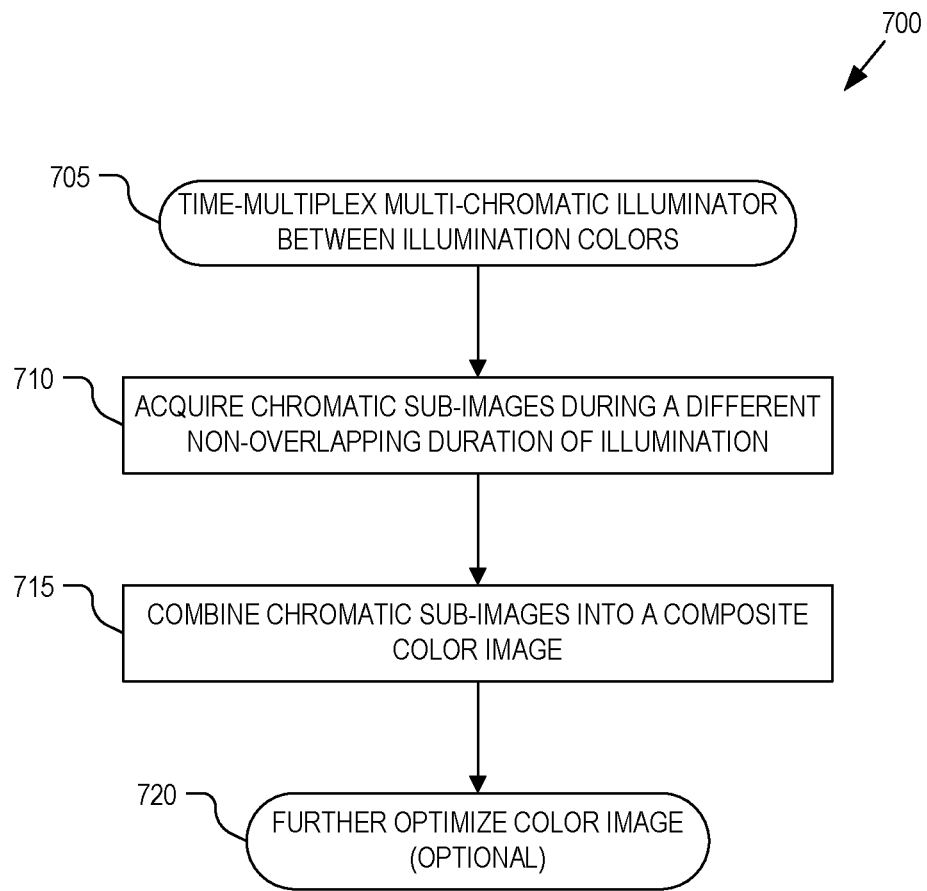
FIG. 7 is a flow chart illustrating a process for acquiring a color image by time-multiplexing a multi-chromatic illuminator, in accordance with an embodiment of the disclosure.

FIG. 7 is a flow chart illustrating a process 700 for generating composite color image 240, in accordance with an embodiment of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

In a process block 705, multi-chromatic illuminator 215 is time-multiplexed between different illumination colors. Each of the illumination colors is time-multiplexed to independently illuminate for at least a corresponding one of non-overlapping durations of illumination of the illumination colors. As such, the different illumination colors may overlap for some period during transitions between the sequential illumination colors; however, the illumination scheme should include at least some period of non-overlapping duration during which image acquisition occurs.

In a process block 710, chromatic sub-images 230 are acquired with image sensor 205. As mentioned, each chromatic sub-image 230 is acquired during a different one of the non-overlapping durations of illumination.

In a process block 715, the chromatic sub-images 230 are combined into composite color image 240 using the techniques described above. Finally, in a process block 720, composite color image 240 may optionally be further optimized using any one or more of the above described optimizations.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An imaging system, comprising:
    an image sensor including an array of sensor pixels overlaid by a filter array including a plurality of different filter types;
    a multi-chromatic illuminator adapted to independently generate a plurality of illumination colors each having a different finite spectral range; and
    a controller coupled to the image sensor and to the multi-chromatic illuminator, the controller including logic that, when executed by the controller, will cause the imaging system to perform operations comprising:
        time-multiplexing the multi-chromatic illuminator between the illumination colors, wherein each of the illumination colors independently illuminates for at least a corresponding one of non-overlapping durations of illumination of the illumination colors;
        acquiring chromatic sub-images with the image sensor, wherein each of the chromatic sub-images is acquired during a different one of the non-overlapping durations of illumination; and
        combining the chromatic sub-images into a composite color image, wherein the combining includes scaling image values output from the sensor pixels based at least in part upon wavelength dependent efficiencies of the different filter types.

2. The imaging system of claim 1, wherein the filter array comprises a color filter array (CFA) including a plurality of different color filter types and wherein each of the different color filter types corresponds to one of the plurality of illumination colors.

3. The imaging system of claim 2, wherein the composite color image is a high dynamic range (HDR) image generated based upon the chromatic sub-images, and wherein combining the chromatic sub-images into the HDR image comprises:
    identifying a saturated image value from a saturated sensor pixel overlaid by a filter element of a first color filter type; and
    adjusting the saturated image value based upon another image value extracted from another sensor pixel adjacent to the saturated sensor pixel but overlaid by another filter element of a second color filter type, wherein the other image value is determined with reference to a given wavelength dependent efficiency of the second color filter type.

4. The imaging system of claim 2, wherein the CFA includes a first color filter type corresponding to a first illumination color, a second color filter type corresponding to a second illumination color, and a third color filter type corresponding to a third illumination color.

5. The imaging system of claim 4, wherein the operations further comprise:
    extracting first color data corresponding to the first illumination color from a given sensor pixel overlaid by a filter element of the second color filter type with reference to a wavelength dependent efficiency of the second color filter type.

6. The imaging system of claim 5, wherein the operations further comprise:
    optimizing the first color data extracted from the given sensor pixel overlaid by the filter element of the second color filter type using a weighted combination of the first color data from the given sensor pixel and other first color data output from another sensor pixel adjacent to the given sensor pixel in the array that is overlaid by another filter element of the first color filter type.

7. The imaging system of claim 4, wherein combining the chromatic sub-images into the composite color image comprises:
    scaling first image values output from the sensor pixels under first filter elements of the first color filter type based at least in part upon a first wavelength dependent efficiency of the first color filter type;
    scaling second image values output from the sensor pixels under second filter elements of the second color filter type based at least in part upon a second wavelength dependent efficiency of the second color filter type; and
    scaling third image values output from the sensor pixels under third filter elements of the third color filter type based at least in part upon a third wavelength dependent efficiency of the third color filter types.

8. The imaging system of claim 1, wherein the operations further comprise:
    acquiring a full color image with all of the illumination colors of the multi-chromatic illuminator enabled; and
    combining the composite color image with the full color image with one or more convolution kernels that trade off image characteristics to generate an optimized composite color image.

9. The imaging system of claim 8, wherein the one or more convolution kernels are two-dimensional convolution kernels selected based upon solving a merit function that trades off the image characteristics including a dynamic range and a spatial resolution.

10. The imaging system of claim 8, wherein the operations further comprise:
    temporally tracking an object moving in the chromatic sub-images; and
    adaptively adjusting the one or more convolution kernels as the object moves between a high noise pixel and a low noise pixel.

11. The imaging system of claim 1, wherein the operations further comprise:
    determining a total power of a given chromatic sub-image by summing image values of the given chromatic sub-image;
    comparing the total power to a threshold total power; and
    reacquiring the given chromatic sub-image when the total power is below the threshold total power.

12. The imaging system of claim 1, wherein the array of sensor pixels comprises a repeating pattern of color pixel units, wherein each of the color pixel unit includes:

a red sensor pixel, a green sensor pixel, a blue sensor pixel, and a fourth color sensor pixel having a color that is different than the red sensor pixel, the green sensor pixel, and the blue sensor pixel; or a red sensor pixel, a green sensor pixel, a blue sensor pixel, and a fourth color sensor pixel having a rotating color that changes across the array of sensor pixels.

13. A method for acquiring a color image with an image sensor having an array of sensor pixels overlaid with a filter array that includes a plurality of different filter types, the method comprising:

time-multiplexing a multi-chromatic illuminator between illumination colors, wherein each of the illumination colors independently illuminates for at least a corresponding one of non-overlapping durations of illumination of the illumination colors;

acquiring chromatic sub-images with the image sensor, wherein each of the chromatic sub-images is acquired during a different one of the non-overlapping durations of illumination; and combining the chromatic sub-images into a composite color image, wherein combining the chromatic sub-images into the composite color image includes scaling image values output from sensor pixels of the image sensor based at least in part upon wavelength dependent efficiencies of the different filter types.

14. The method of claim 13, wherein the filter array comprises a color filter array (CFA) including different color filter types, and wherein the different color filter types each corresponds to one of the plurality of illumination colors.

15. The method of claim 14, wherein the composite color image is a high dynamic range (HDR) image generated based upon the chromatic sub-images, and wherein combining the chromatic sub-images into the HDR image comprises:

identifying a saturated image value from a saturated sensor pixel overlaid by a filter element of a first color filter type; and adjusting the saturated image value based upon another image value extracted from another sensor pixel adjacent to the saturated sensor pixel but overlaid by another filter element of a second color filter type, wherein the other image value is determined with reference to a given wavelength dependent efficiency of the second color filter type.

16. The method of claim 14, wherein the CFA includes a first color filter type corresponding to a first illumination color, a second color filter type corresponding to a second illumination color, and a third color filter type corresponding to a third illumination color.

17. The method of claim 16, further comprising:
extracting first color data corresponding to the first illumination color from a given sensor pixel overlaid by a filter element of the second color filter type with reference to a wavelength dependent efficiency of the second color filter type.

18. The method of claim 17, further comprising:
optimizing the first color data extracted from the given sensor pixel overlaid by the filter element of the second color filter type using a weighted combination of the first color data from the given sensor pixel and other first color data output from another sensor pixel adjacent to the given sensor pixel in the array that is overlaid by another filter element of the first color filter type.

19. The method of claim 16, wherein combining the chromatic sub-images into the composite color image comprises:

scaling first image values output from the sensor pixels under first filter elements of the first color filter type based at least in part upon a first wavelength dependent efficiency of the first color filter type;

scaling second image values output from the sensor pixels under second filter elements of the second color filter type based at least in part upon a second wavelength dependent efficiency of the second color filter type; and scaling third image values output from the sensor pixels under third filter elements of the third color filter type based at least in part upon a third wavelength dependent efficiency of the third color filter types.

20. The method of claim 13, further comprising:
acquiring a full color image with all of the illumination colors of the multi-chromatic illuminator enabled; and combining the composite color image with the full color image with one or more convolution kernels that trade off image characteristics to generate an optimized composite color image.

21. The method of claim 20, wherein the one or more convolution kernels are two-dimensional convolution kernels selected based upon solving a merit function that trades off the image characteristics including a dynamic range and a spatial resolution.

22. The method of claim 20, further comprising:
temporally tracking an object moving in the chromatic sub-images; and adaptively adjusting the one or more convolution kernels as the object moves between a high noise pixel and a low noise pixel.

23. The method of claim 13, further comprising:
determining a total power of a given chromatic sub-image by summing image values of the given chromatic sub-image;

comparing the total power to a threshold total power; and
reacquiring the given chromatic sub-image when the total power is below the threshold total power.

24. An imaging system, comprising:
an image sensor including an array of sensor pixels;
a multi-chromatic illuminator adapted to independently generate a plurality of illumination colors each having a different finite spectral range; and a controller coupled to the image sensor and to the multi-chromatic illuminator, the controller including logic that, when executed by the controller, will cause the imaging system to perform operations comprising:
time-multiplexing the multi-chromatic illuminator between the illumination colors, wherein each of the illumination colors independently illuminates for at least a corresponding one of non-overlapping durations of illumination of the illumination colors;

acquiring chromatic sub-images with the image sensor, wherein each of the chromatic sub-images is acquired during a different one of the non-overlapping durations of illumination; and combining the chromatic sub-images into a composite color image, wherein the array of sensor pixels comprises a repeating pattern of color pixel units, wherein each of the color pixel unit includes:
a red sensor pixel, a green sensor pixel, a blue sensor pixel, and a fourth color sensor pixel having a color that is different than the red sensor pixel, the green sensor pixel, and the blue sensor pixel; or a red sensor pixel, a green sensor pixel, a blue sensor pixel, and a fourth color sensor pixel having a rotating color that changes across the array of sensor pixels.

25. A machine readable storage medium having instructions stored therein, that when executed by a processor causes an imaging system to perform operations comprising:

time-multiplexing a multi-chromatic illuminator between illumination colors, wherein each of the illumination colors independently illuminates for at least a corresponding one of non-overlapping durations of illumination of the illumination colors;

acquiring chromatic sub-images with an image sensor having an array of sensor pixels, wherein each of the chromatic sub-images is acquired during a different one of the non-overlapping durations of illumination;

combining the chromatic sub-images into a composite color image;

acquiring a full color image with all of the illumination colors of the multi-chromatic illuminator enabled; and combining the composite color image with the full color image with one or more convolution kernels that trade off image characteristics to generate an optimized composite color image.

26. A machine readable storage medium having instructions stored therein, that when executed by a processor causes an imaging system to perform operations comprising:

time-multiplexing a multi-chromatic illuminator between illumination colors, wherein each of the illumination colors independently illuminates for at least a corresponding one of non-overlapping durations of illumination of the illumination colors;

acquiring chromatic sub-images with an image sensor having an array of sensor pixels, wherein each of the chromatic sub-images is acquired during a different one of the non-overlapping durations of illumination;

combining the chromatic sub-images into a composite color image;

determining a total power of a given chromatic sub-image by summing image values of the given chromatic sub-image;

comparing the total power to a threshold total power; and reacquiring the given chromatic sub-image when the total power is below the threshold total power.

* * * * *